United States Patent
Pu et al.

(10) Patent No.: US 8,963,866 B2
(45) Date of Patent: Feb. 24, 2015

(54) IN-CELL TOUCH DISPLAY DEVICE

(71) Applicant: Giantplus Technology Co., Ltd., Miaoli County (TW)

(72) Inventors: Chia-Chuan Pu, Miao-Li County (TW); Chien-Ying Peng, Miao-Li County (TW)

(73) Assignee: Giantplus Technology Co., Ltd., Miao-Li County (TW)

( * ) Notice: Subject to any disclaimer, the term of this patent is extended or adjusted under 35 U.S.C. 154(b) by 135 days.

(21) Appl. No.: 13/755,086

(22) Filed: Jan. 31, 2013

(65) Prior Publication Data
US 2013/0328800 A1 Dec. 12, 2013

(30) Foreign Application Priority Data
Jun. 11, 2012 (TW) .............................. 101120891 A

(51) Int. Cl.
*G06F 3/041* (2006.01)
*G06F 3/044* (2006.01)
*G09G 3/00* (2006.01)

(52) U.S. Cl.
CPC .............. *G06F 3/041* (2013.01); *G06F 3/0412* (2013.01); *G06F 3/044* (2013.01); *G09G 3/00* (2013.01)
USPC ........................................................ 345/173

(58) Field of Classification Search
CPC ......... G06F 3/041; G06F 3/044; G06F 3/045; G06F 3/0412; G09G 3/00
USPC ............................ 345/87, 156–166, 173–178
See application file for complete search history.

(56) References Cited

U.S. PATENT DOCUMENTS

| 8,031,180 B2 * | 10/2011 | Miyamoto et al. ............ 345/173 |
| 2011/0102360 A1 * | 5/2011 | Chen et al. .................... 345/173 |
| 2011/0304564 A1 * | 12/2011 | Kim et al. ..................... 345/173 |
| 2012/0086879 A1 | 4/2012 | Yu et al. |

FOREIGN PATENT DOCUMENTS

TW 201215954 A 4/2012

* cited by examiner

*Primary Examiner* — Andrew Sasinowski
(74) *Attorney, Agent, or Firm* — Rosenberg, Klein & Lee

(57) ABSTRACT

An in-cell touch display device comprises a plurality of pixel structures, a display scanning circuit, a touch scanning circuit, and a control module. The pixel structures are applied to display an image and include a plurality of display scanning lines and a plurality of common electrodes. The display scanning circuit is coupled with the display scanning lines for actuating the pixel structures to display the image. The touch scanning circuit is coupled with the common electrodes so as to receive a touch signal by scanning the common electrodes. The control module is coupled with the display scanning circuit and the touch scanning circuit to receive and process the touch signal for executing the touch step. The display scanning circuit and the touch scanning circuit are integrated on the same substrate to reduce the thickness of the touch display device without affecting the touch effect.

8 Claims, 4 Drawing Sheets

IN-CELL TOUCH DISPLAY DEVICE

BACKGROUND OF THE INVENTION

1. Field of the Invention

The present invention relates to a circuit structure of a touch display device, in particular to a circuit structure that shares an electrode between a touch portion and a display portion of an in-cell touch display device and integrates a touch scanning circuit and a display scanning circuit on a substrate so as to save the routing area and the structure space for reducing cost.

2. Description of the Related Art

Due to the evolution of the display technique, the screen evolved from earlier on the Cathode Ray Tube (CRT) to the main stream nowadays, Liquid Crystal Display (LCD). The LCD has the advantages of light weight and small size, the image quality thereof is not worse than the CRT. Therefore, after the mass production, LCD speedily holds the most part of the display market. Up to the present, many kinds of LCD are developed. A thin-film transistor LCD (TFT-LCD) makes use of thin-film transistor technique to improve the image quality and is related to an active matrix LCD that is applied in televisions, flat panel displays, and projectors. The panel of the TFT-LCD is defined as a layer of liquid crystal placed between two glass substrates. The upper layer of the glass substrates is a color filter, and the bottom layer of the glass substrates includes a transistor, through which an electric current is passed and results a variation of electric field and deflection of liquid crystal molecule so as to change the polarization of the light and determine the shading value of the pixels via a polarizer.

A touch panel makes use of a sensorial device using a multi-touch contactor such as fingers or pen point to input a signal. The device mainly comprises a pressure plate having a high sensitivity to the exerted pressure. When an object exerts a pressure, the pressure plate generates an analog signal. The location of the pressure source is located via a sensorial electrode, and then the controller transforms the analog signal into a digital signal that is acceptable for the system. Further, the touch driver of the system integrates each element for compilation and results in a respective effect, which is then output for generating efficiency such as pressing a button or an operating apparatus. A touch display device is resulted after combining the two techniques of touch panel and LCD so as to integrate the display function and the touch function. The button or dialog box displayed on the screen is operated by touch. Therefore, when users touch the figured button on the screen, each connecting device is actuated according to the pre-compiled program, thereby replacing the mechanical button panel. After pressing the button, users receive a related suggestion or information via the screen. Moreover, it is convenient to add or adjust the related functions of the button without remaking a new button panel. The tablet personal computer, the most popular device nowadays, is mainly operated by touching and omitting a mouse and a keyboard thereby greatly improving the weight of the device body and the operation.

Referring to FIG. 1, a structural view of the conventional touch display device is shown. A touch substrate 11 is disposed at the top layer, a color filter substrate 12, a RGB layer 13, a common electrode 14, a liquid crystal layer 15, a display TFT array substrate 16, and a display TFT substrate 17 are sequentially disposed thereunder, thereby integrating the touch and display functions to become a touch display device. However, the thickness of the touch display device is increased because the touch display device is superposed by the substrate layers, each with a certain thickness. For example, the touch substrate 11 occupies a quite large part of the thickness of the touch display device. Nowadays, the situation that everyone has a digital device brings about a tendency of ultra-thin body of the device. Therefore, to integrate the layers of the device structure for reducing the entire thickness is conducive to the tendency and increases the market sales volume.

To solve the conventional structure with a thicker device body, the present invention provides an in-cell touch display device which includes a thinner structure. Under the condition of not affecting the entire operation principle, the display scanning circuit and the touch scanning circuit of the touch substrate are integrated into the display TFT array substrate, and the touch detecting line within the original inner touch substrate is reserved at the original position of the touch substrate. Therefore, the touch substrate structure is dispersed whereby the entire thickness becomes thinner for solving the conventional problem effectively.

SUMMARY OF THE INVENTION

The main purpose of the present invention is to provide an in-cell touch display device, which is applied in a thinner touch display device for improving the conventional structure of the touch display device by integrating the inner touch substrate into other substrate to reduce the original thickness of the touch substrate and attain an ultra-thin efficiency.

The second purpose of the present invention is to provide an in-cell touch display device, which integrates a touch scanning circuit and the display scanning circuit into the display TFT array substrate for sensing a touch signal via a touch detecting line independent with a common electrode. Therefore, the touch display device maintains the touch locating efficiency while the thickness thereof becomes thinner.

The third purpose of the present invention is to provide an in-cell touch display device. The conventional touch display device sends out the touch transmission signal via an Integrated Circuit (IC). The present invention sends out the touch transmission signal via a touch scanning circuit. The touch scanning circuit is integrated into the display TFT array substrate, so the IC arrangement can be omitted for saving the cost for installing IC and effectively planning the distribution.

The last purpose of the present invention is to provide an in-cell touch display device, which integrates the touch scanning circuit and the display scanning circuit into the same substrate. Such a preparation technique does not need to install the touch substrate, thereby reducing not only the thickness but also the cost of laying the touch substrates for lowering the preparation cost.

To attain the above-mentioned purposes, the present invention provides an in-cell touch display device, which comprises a plurality of pixel structures, a display scanning circuit, a touch scanning circuit and a control module. The pixel structures are applied to display an image. A plurality of display scanning lines and a plurality of common electrodes are disposed on the pixel structures. The display scanning electrode is coupled with the display scanning lines to actuate the pixel structures for displaying the image. The touch scanning circuit is coupled with the common electrodes, and then the touch scanning circuit scans the common electrodes to receive a touch signal for executing a touch step. The control module is coupled with the display scanning circuit and the touch scanning circuit to control both circuits to scan the pixel structures or the common electrodes so as to execute the touch step. The display scanning circuit and the touch scanning circuit are integrated into a same substrate which could be a color filter substrate or a display TFT array substrate. Under the condition of not affecting the touch efficiency, such a structure is able to decrease the thickness of the touch display device and attain an ultra-thin efficiency.

Before describing in detail, it should note that the like elements are denoted by the similar reference numerals throughout disclosure.

DETAILED DESCRIPTION OF THE PREFERRED EMBODIMENTS

The present invention provides an in-cell touch display device with a thinner touch display structure. To improve the conventional technique, the present invention integrates a touch scanning circuit and a display scanning circuit into a display TFT array substrate, thereby rendering the entire thickness thinner. Furthermore, the preparation cost is decreased because the touch transmission signal is not sent via an IC.

Figure 1:
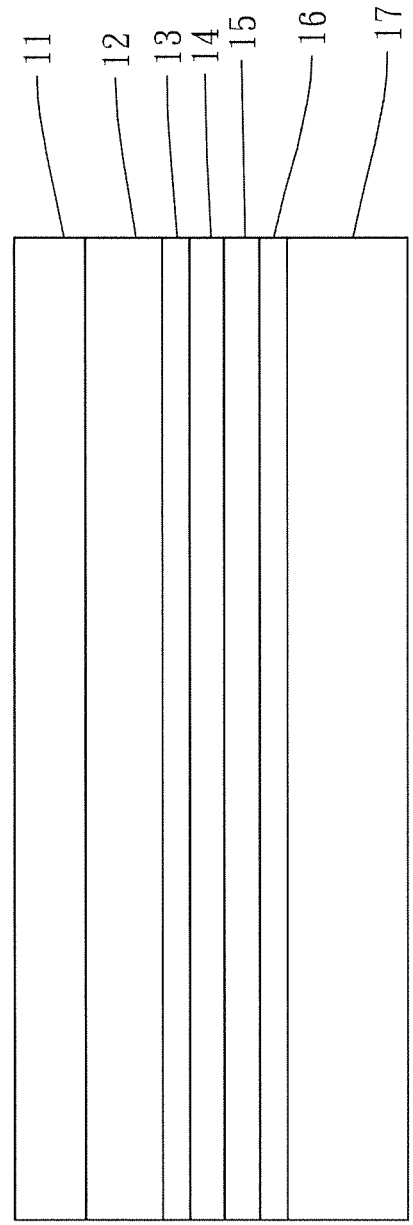
FIG. 1 is a structural view showing a conventional touch display device.
Figure 2:
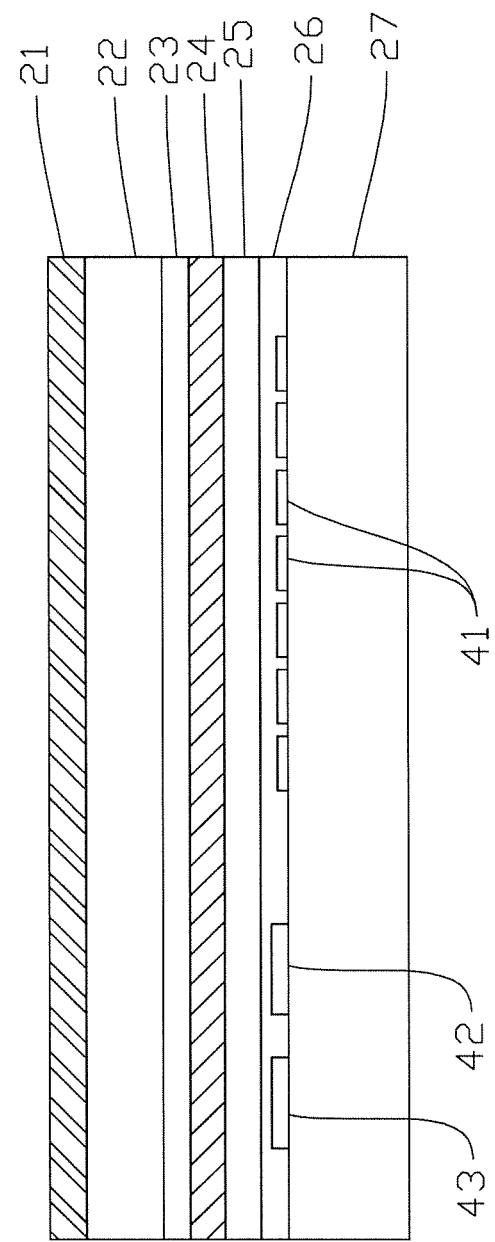
FIG. 2 is a structural view showing an in-cell touch display device of the present invention.

Referring FIG. 2, a structural view of the in-cell touch display device of the present invention is shown. A plurality of touch detecting lines 21 are disposed at a top layer, a color filter substrate 22, a RGB chromatography 23, a plurality of common electrodes 24, a liquid crystal layer 25, a display TFT array substrate 26, and a display TFT substrate 27 are sequentially disposed thereunder. The display TFT array substrate integrates a plurality of pixel structures 41, a display scanning circuit 42, and a touch scanning circuit 43. To compare with FIG. 1, the structure of the present invention omits the touch substrate 11 and integrates the display scanning circuit 42 and the touch scanning circuit 43 into the display TFT array substrate 26. The touch detecting lines 21 replace the touch substrate 11. Therefore, the thickness of the entire structure is effectively decreased under the condition of not affecting the touch efficiency so as to attain the purpose of an ultra-thin device body. The practicing touch technique will be described subsequently.

Figure 3:
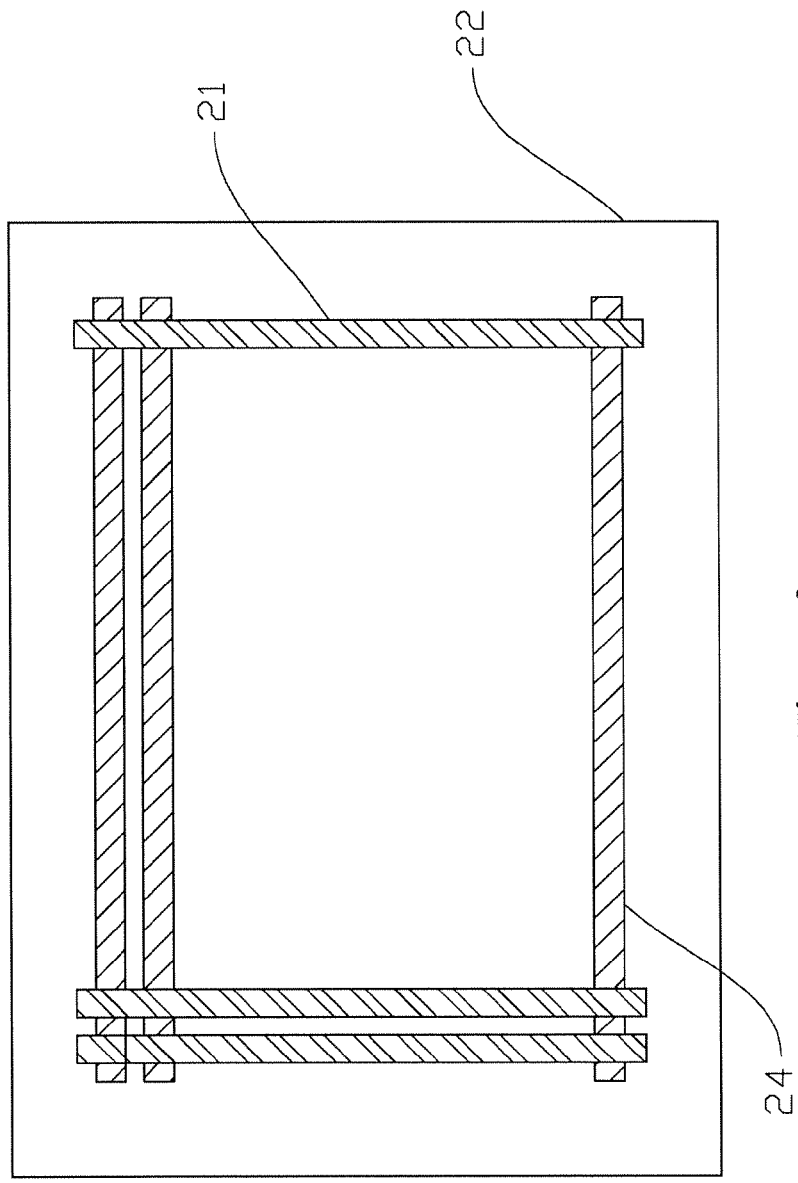
FIG. 3 is a vertical view showing the in-cell touch display device of the present invention.

Referring to FIG. 3, a vertical view of the in-cell touch display device of the present invention is shown. The touch detecting lines 21 are defined the distribution on the color filter substrate 22. The micrometer (μm) can be the unit of the distribution of the electronic circuit, so the thickness thereof is much lower than the thickness of the touch substrate 11 as if the touch substrate 11 is not disposed.

Figure 4:
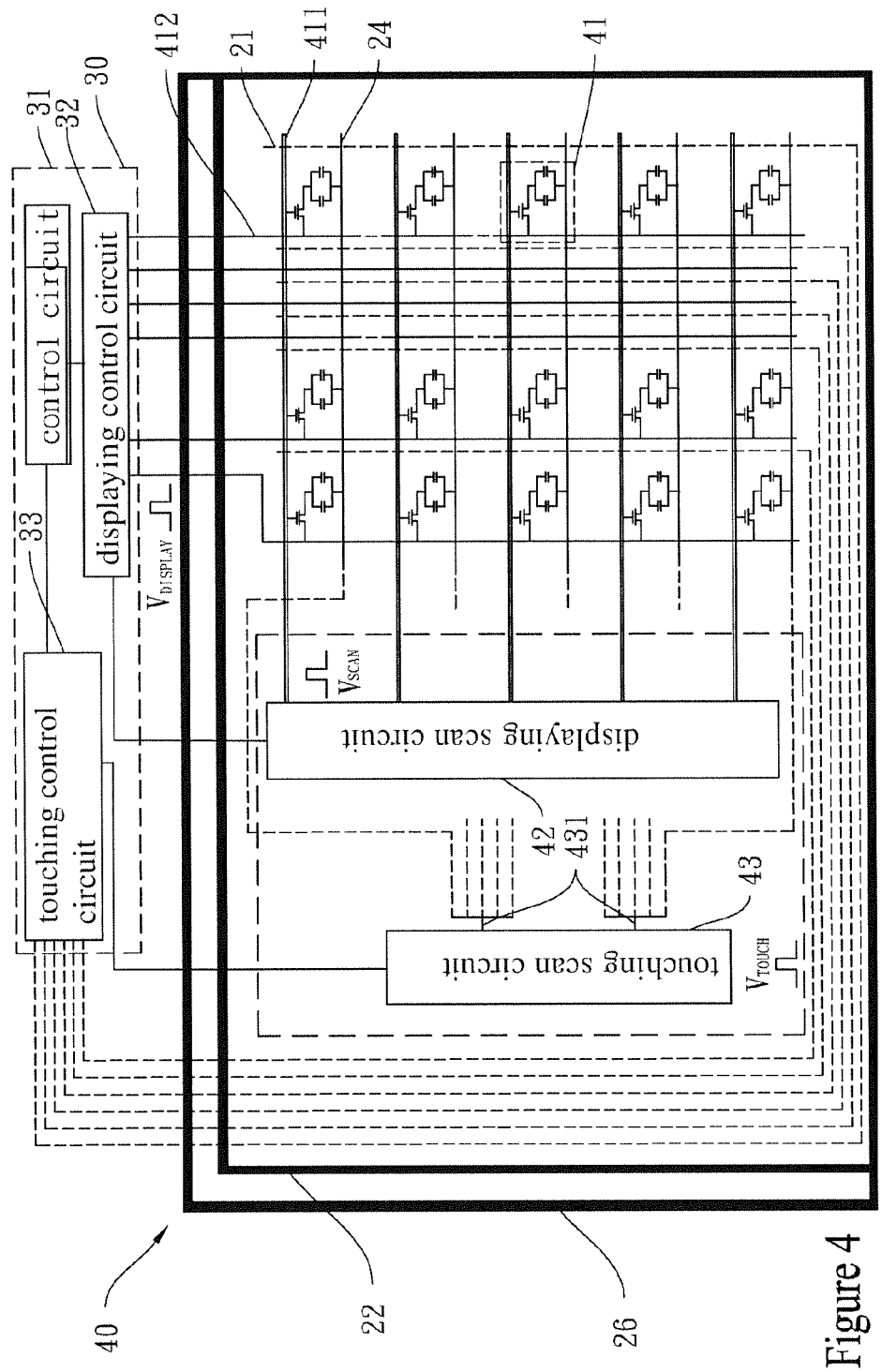
FIG. 4 is a detailed structural view showing the in-cell touch display device of the present invention.

Referring to FIG. 4, a detailed structural view of the in-cell touch display device is shown. A touch display device disclosed by an in-cell touch display device comprises a control module 30 and a TFT-LCD 40. The TFT-LCD 40 includes a plurality of pixel structures 41, a display scanning circuit 42, and a touch scanning circuit 43. The pixel structures 41 include a plurality of touch detecting lines 21, a plurality of common electrodes 24, a plurality of display scanning lines 411, and a plurality of display signal electrodes 412. The pixel structures 41 are applied to display an image. The display scanning circuit 42 is coupled with the display scanning lines 411 to actuate the pixel structures to display the image. The touch scanning circuit 43 is coupled with the common electrodes 24, and then the touch scanning circuit 43 scans the common electrodes 24 to receive a touch signal $V_{TOUCH}$ so as to execute a touch step. The control module 30 is coupled with the display scanning circuit 42 and the touch scanning circuit 43 to control the display scanning circuit 42 and the touch scanning circuit 43 to scan the pixel structures 41 or the common electrodes 24. The display scanning circuit 42 and the touch scanning circuit 43 are integrated into the color filter substrate 22 or the display TFT array substrate 26.

The control module 30 includes a control circuit 31, a display control circuit 32, and a touch control circuit 33. The display control circuit 32 is coupled with the display signal electrodes 412 and the display scanning circuit 42. The display control circuit 32 controls the display scanning circuit 42 to scan the display scanning lines 411 and respectively outputs a display signal $V_{DISPLAY}$ to the pixel structures 41 for actuating the pixel structures 41 to display the image. The touch control circuit 33 is coupled with the touch detecting lines 21 and the touch scanning circuit 43, and then the touch control circuit 33 controls the touch scanning circuit 43 to scan the common electrodes 24, receive and process a touch signal $V_{TOUCH}$ transmitted from the touch detecting lines 21 so as to execute touching. The control circuit 31 is coupled with the display control circuit 32 and the touch control circuit 33 for displaying and touching There are different kinds of ways to couple the touch scanning circuit 43 with the common electrodes 24 such as directly coupling all the common electrodes 24 with the touch scanning electrode 43, or disposing a plurality of touch scanning electrodes 431 on the touch scanning circuit 43. Because the amount of the touch scanning electrodes 431 is less than that of the common electrodes 24, the common electrodes 24 are divided into groups with a specific quantity, such as five common electrodes as a group. Each group is respectively connected to the touch scanning electrodes 431; or after grouping, only one common electrode in each group is connected to the touch scanning electrodes 431. The connecting ways between the common electrodes 24 and the touch scanning electrodes 431 can be chosen according to the demand.

The procedure of the touch technique of the present invention is described as follows. When a touch object such as a finger or a touch pen is closed to any of the touch detecting lines 21, a coupling capacitance is generated between the touch object and the touch detecting line 21 and causes an electromagnetic coupling. The pixel structures 41 show the touch signal $V_{TOUCH}$ to the touch object via the touch detecting lines 21 or receive the touch signal $V_{TOUCH}$ sent by the touch object from the touch detecting lines 21 and communicate to the touch control circuit 33. The touch control circuit 33 reads the touch signals $V_{TOUCH}$ and gives order to the touch scanning circuit 43 to use the common electrode 24 as a touch positioning electrodes. When lines of the touch detecting lines 21 and the common electrodes 24 within the pixel structures 41 are intersected, a location clicked by the touch object is positioned to complete the touch step. When the touch signal $V_{TOUCH}$ is detected on several touch detecting lines 21, the touch detecting line 21 with the strongest signal or a center of the touch detecting lines 21 detecting the touch signals $V_{TOUCH}$ is chosen to be a touch position point.

To sum up, the present invention provides an in-cell touch display device comprising a plurality of pixel structures, a display scanning circuit, a touch scanning circuit, and a control module. The pixel structures are applied to display an image. The pixel structures include a plurality of display scanning lines and a plurality of common electrodes. The display scanning circuit is coupled with the display scanning lines to actuate the pixel structures to display the image. The touch scanning circuit is coupled with the common electrodes. The touch scanning circuit scans the common electrodes and receives a touch signal so as to execute a touch step. The control module is coupled with the display scanning circuit and the touch scanning circuit and controls both circuits to scan the pixel structures or the common electrodes so as to execute touching. The display scanning circuit and the touch scanning circuit are integrated on the same substrate. Under the condition of not affecting the touch efficiency, such a structure is able to decrease the thickness of the touch display device and attain an ultra-thin efficiency.

While we have shown and described the embodiment in accordance with the present invention, it should be clear to those skilled in the art that further embodiments may be made without departing from the scope of the present invention.

The invention claimed is:

1. An in-cell touch display device comprising:
 a plurality of pixel structures displaying an image;
 a display scanning circuit coupled with a plurality of display scanning lines of said pixel structures to scan said display scanning lines, thereby actuating said pixel structures to display said image;
 a touch scanning circuit coupled with a plurality of common electrodes of said pixel structures to scan said common electrodes; and
 a control module coupled with said display scanning circuit and said touch scanning circuit to control said display scanning circuit scanning said pixel structures and displaying said image or to control said touch scanning circuit scanning said common electrodes for a touch step;
 wherein, said display scanning circuit and said touch scanning circuit are disposed on a same substrate; said control module is coupled with a plurality of touch detecting lines and correspondingly control said touch detecting lines receive a control signal so as to execute said touch step.

2. The in-cell touch display device as claimed in claim 1, wherein said control module comprises:
 a display control circuit coupled with a plurality of display signal electrodes of said pixel structures and said display scanning circuit to control said display scanning circuit scanning said display scanning lines and correspondingly outputting a display signal to said pixel structures for actuating said pixel structures to display said image;
 a touch control circuit coupled with said touch detecting lines and said touch scanning circuit for receiving and processing a touch signal to control said touch scanning circuit scanning said common electrodes and to correspondingly control said touch detecting lines receiving said control signal so as to execute said touch step; and
 a control circuit coupled with said display control circuit and said touch control circuit to control said display control circuit and said touch control circuit executing display and said touch step.

3. The in-cell touch display device as claimed in claim 1, wherein said substrate is a color filter substrate.

4. The in-cell touch display device as claimed in claim 1, wherein said substrate is a thin-film transistor array substrate.

5. The in-cell touch display device as claimed in claim 1, wherein said touch scanning circuit is coupled with said common electrodes.

6. The in-cell touch display device as claimed in claim 1, wherein when said touch scanning circuit is coupled with said common electrodes, said common electrodes are divided into a plurality of touch scanning electrodes; each of said touch scanning electrodes corresponds to part of said common electrodes.

7. The in-cell touch display device as claimed in claim 1, wherein every five common electrodes are coupled together as a touch scanning electrode, and each touch scanning electrode is respectively coupled with said touch scanning circuit.

8. The in-cell touch display device as claimed in claim 7, wherein one of said common electrodes is said touch scanning electrode; said touch scanning electrode is respectively coupled with said touch scanning circuit.

* * * * *